United States Patent
Beltran Corona

(10) Patent No.: US 9,382,889 B2
(45) Date of Patent: Jul. 5, 2016

(54) HOMOGENEOUS FUEL-AIR-MIX METHOD AND APPARATUS FOR INTERNAL COMBUSTION ENGINES

(76) Inventor: Jose Maria Beltran Corona, Tlalnepantla (MX)

( * ) Notice: Subject to any disclaimer, the term of this patent is extended or adjusted under 35 U.S.C. 154(b) by 308 days.

(21) Appl. No.: 13/609,200

(22) Filed: Sep. 10, 2012

(65) Prior Publication Data

US 2013/0081598 A1    Apr. 4, 2013

Related U.S. Application Data

(60) Provisional application No. 61/540,859, filed on Sep. 29, 2011.

(51) Int. Cl.

| F02M 61/14 | (2006.01) |
|---|---|
| B05B 1/34 | (2006.01) |
| F02M 69/04 | (2006.01) |
| F02M 35/10 | (2006.01) |
| F02M 69/08 | (2006.01) |
| F02M 23/00 | (2006.01) |
| F02M 29/04 | (2006.01) |
| F02D 41/00 | (2006.01) |
| F02D 41/12 | (2006.01) |
| F02D 41/32 | (2006.01) |
| F02D 35/02 | (2006.01) |

(52) U.S. Cl.
CPC ........... *F02M 69/044* (2013.01); *F02M 23/003* (2013.01); *F02M 29/04* (2013.01); *F02M 35/10072* (2013.01); *F02M 35/10216* (2013.01); *F02M 69/047* (2013.01); *F02M 69/08* (2013.01); *F02D 35/027* (2013.01); *F02D 41/0087* (2013.01); *F02D 41/123* (2013.01); *F02D 41/32* (2013.01); *F02M 23/006* (2013.01); *Y02T 10/146* (2013.01); *Y02T 10/148* (2013.01)

(58) Field of Classification Search
CPC . F02M 69/044; F02M 35/10078; F02B 17/00
USPC ............. 123/470; 239/5, 405, 406, 469, 482, 239/518
See application file for complete search history.

(56) References Cited

U.S. PATENT DOCUMENTS 3,656,464 A *  4/1972  Hilborn .................. F02M 69/04
                                                                123/470
3,756,205 A     9/1973  Frost
(Continued)

FOREIGN PATENT DOCUMENTS

| JP | 58144663 A | 8/1983 |
| JP | 59141765 A | 8/1984 |

(Continued)

*Primary Examiner* — Mahmoud Gimie
*Assistant Examiner* — David Hamaoui

(57) ABSTRACT

New strategies for control and feeding of air/fuel homogenous mix for internal combustion engines, mainly for fuel injection engines. This new strategies are to get an air/fuel mixture homogeneous and of adequate volume. Fuel in contact with air for a sufficient length of time required for better physical combination prior to the time of ignition at the spark plug and of a volume such that the combustion flame can reach the entire mixture admitted. Strategies to prevent the problem known as "wet wall". This consisting of a new intake manifold, new fuel injectors, injector nozzles and new algorithms and strategies in the control software program of the ECU or MCU controlling the internal combustion engines.

10 Claims, 12 Drawing Sheets

(56) References Cited

U.S. PATENT DOCUMENTS

| | | | |
|---|---|---|---|
| 3,972,314 A | 8/1976 | Dupont et al. | |
| 4,211,191 A * | 7/1980 | Kawamura et al. | 123/470 |
| 4,617,898 A * | 10/1986 | Gayler | 123/460 |
| 4,773,374 A * | 9/1988 | Kiuchi et al. | 123/470 |
| 4,791,903 A | 12/1988 | Fujieda et al. | |
| 4,925,110 A * | 5/1990 | Takeda et al. | 239/533.12 |
| 5,035,358 A * | 7/1991 | Katsuno et al. | 239/403 |
| 5,074,269 A * | 12/1991 | Herbon et al. | 123/470 |
| 5,085,369 A * | 2/1992 | Aoki et al. | 239/5 |
| 5,156,124 A * | 10/1992 | Sugimoto et al. | 123/302 |
| 5,474,046 A | 12/1995 | Corona | |
| 5,540,387 A * | 7/1996 | Reiter | F02M 51/0682 239/408 |
| 5,769,060 A * | 6/1998 | Matsumoto | 123/585 |
| 6,065,691 A * | 5/2000 | West | 239/407 |
| 6,102,299 A * | 8/2000 | Pace et al. | 239/5 |
| 2001/0023685 A1* | 9/2001 | Nawa et al. | 123/470 |
| 2002/0014228 A1* | 2/2002 | Yamada et al. | 123/559.1 |
| 2003/0070659 A1 | 4/2003 | Kihara et al. | |
| 2004/0045533 A1 | 3/2004 | Sukegawa et al. | |

FOREIGN PATENT DOCUMENTS

| | | |
|---|---|---|
| MX | 187020 A | 11/1997 |
| WO | WO 2013046073 A1 | 4/2013 |

* cited by examiner

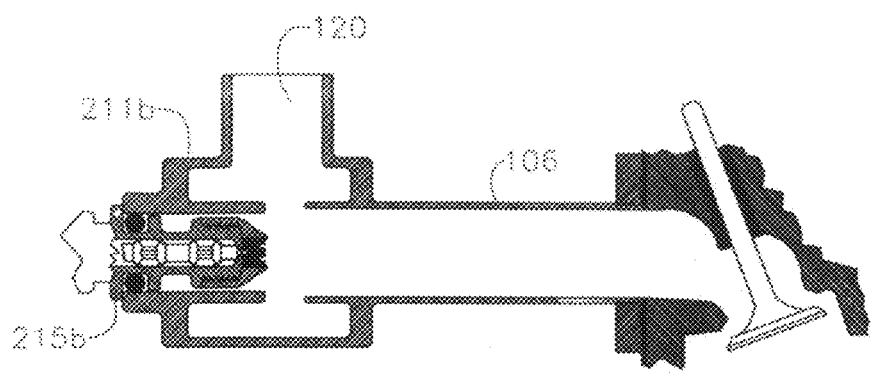
FIG 4-B
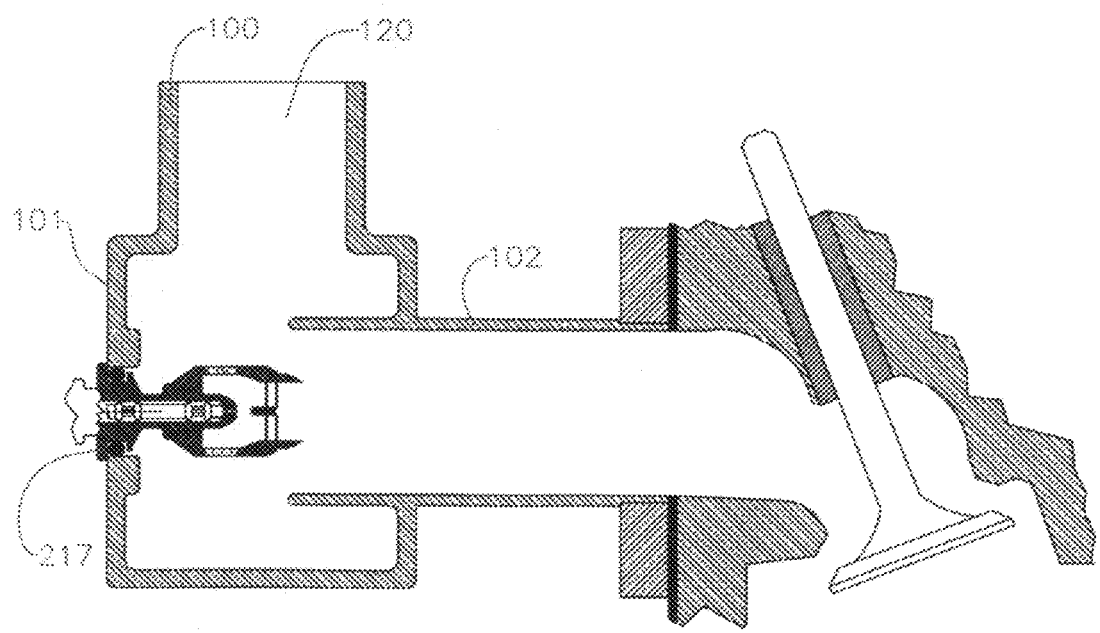
FIG 4-C

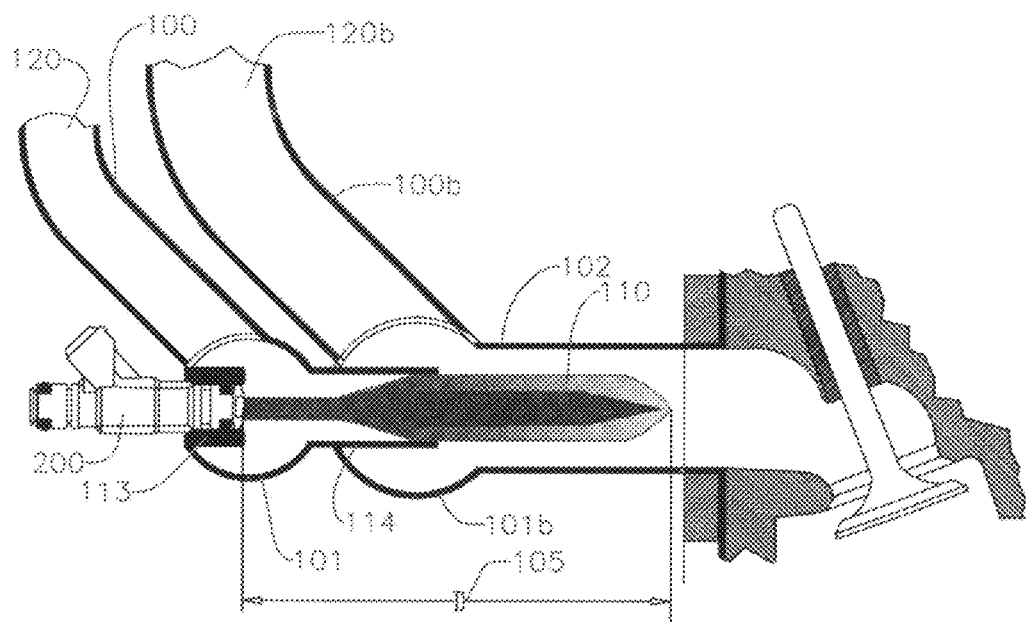
FIG 5
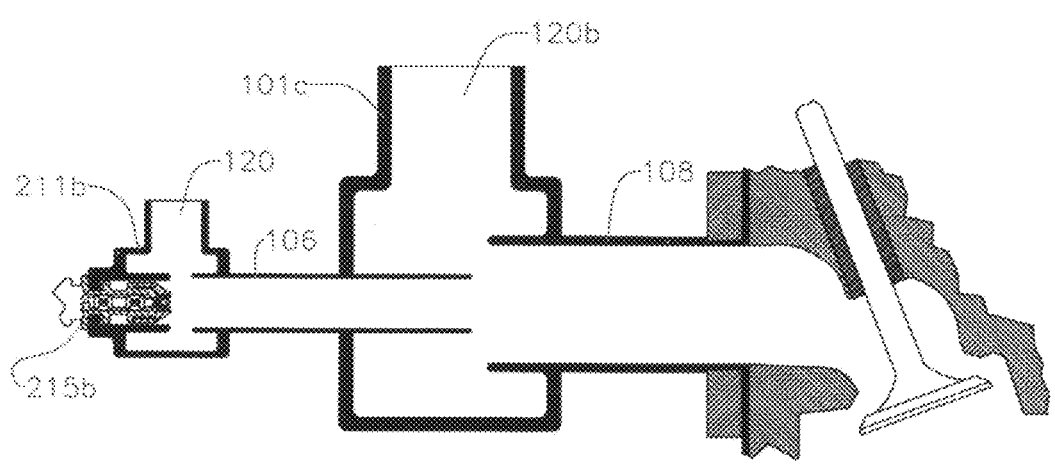
FIG 5-B

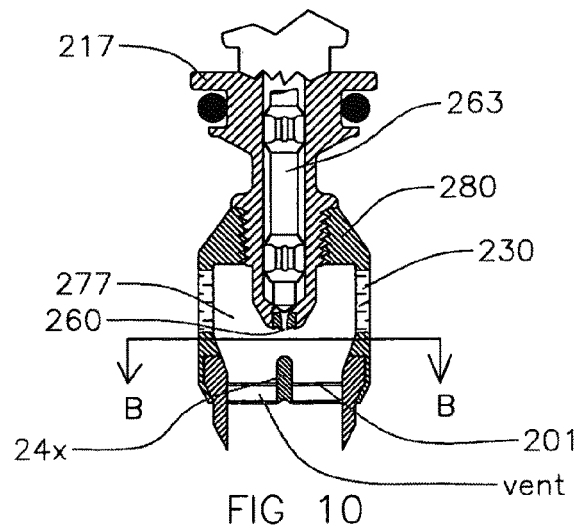
FIG 10
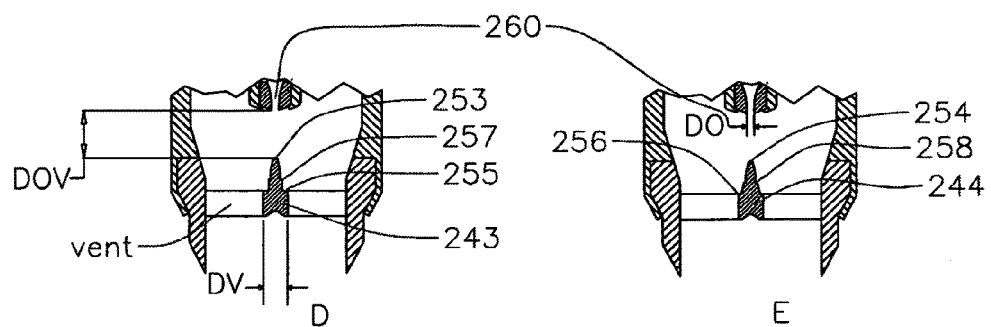
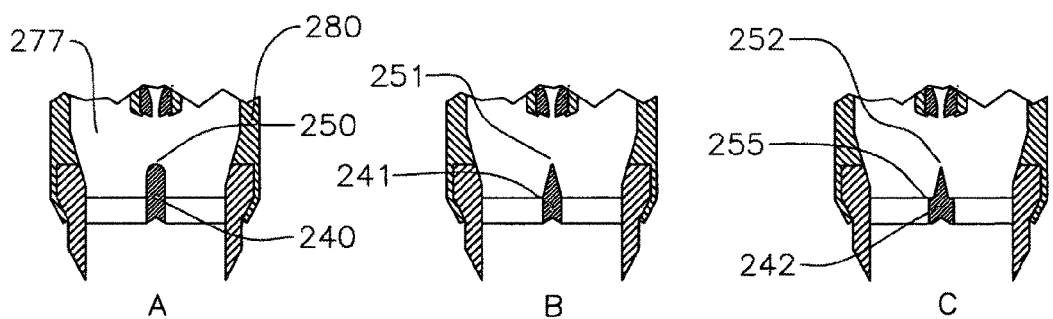
FIG 10-b

FIG 10-c

HOMOGENEOUS FUEL-AIR-MIX METHOD AND APPARATUS FOR INTERNAL COMBUSTION ENGINES

CROSS-REFERENCE TO RELATED PATENT APPLICATIONS

This patent application is a non-provisional patent application of provisional patent application No. 61/540,859 filed on Sep. 29, 2011, the priority benefits of which are hereby claimed.

INVENTION FIELD

This invention relates to fuel injection systems for internal combustion engines used especially in vehicles. The invention consists of: a new feeding strategy of air/fuel mixture, new intake manifold, fuel injectors and control system programming including "software" of the computers in vehicles knows as "MCU" or "ECU".

BACKGROUND OF THE INVENTION

The main problem to a greater or lesser extent that previous or current technologies have in the field of air/fuel supply with carburetor as well as with fuel injection is poor combustion of fuel due to a bad air/fuel mixture. This causes low efficiency of engine performance, high heat in the engine and high contamination emissions.

Numerous improvements have been devised to try to avoid the problem but, basically, these have only generated modest improvements. The greatest progress has been achieved with the use of injectors, oxygen sensors and electronic control of injection and ignition timing of spark plugs. Three-way catalytic converters are used to significantly reduce pollutant emissions to the atmosphere; however, gasoline consumption is not improved by this. Neither have engine emissions before treatment in the catalytic converter decreased, nor has engine overheating been reduced. The use of catalytic converters causes a small increase in gasoline consumption by being an extra burden in the exhaust and a "resistance" to the flow of gases while also adding cost and vulnerability to the system.

OVERALL OBJECT OF THIS INVENTION

The overall object of this invention is the increase in efficiency, reduction of overheating and pollution of exhaust in internal combustion engines. This is to be achieved through improvements of the air/fuel mixture ratio in combustion chambers. This is achieved through the elimination of the so-called "wet wall" effect following fuel injection into air in passages outside the combustion chambers. Other advantages, including simplification of computer programs in computers attached to engines, as well as some manufacturing efficiencies will accrue as a result.

BRIEF SUMMARY OF THE INVENTION

Note 1: In the following description I refer to or mention "fuel"; this is to be construed as any type of gasoline or alternative fuel that can be used in an internal combustion engine. This includes gasoline and/or alternative fuel injected externally of the combustion chambers; not what is known as "direct injection".

Note 2. In referring to the front or cone jet of fuel injected, I intend to indicate precisely the condition of such a jet injected during the time and duration of such fuel injection shot, before being mixed with intake air, when the jet fuel is under the effect of injected pressure. It will be obvious that once outside the effect of such injection pressure in such fuel jet, the latter already mixed with the intake air will result in an object of the present invention being sucked by the vacuum present at opening of the intake valves of the combustion engine. When this happens, some fuel droplets and air injected will rub surfaces of the intake manifold and valve cavity as well as the inlet valves themselves, but they will be mixed with air and therefore, the amount of fuel that adheres to the surfaces will be minimal, counterbalanced by the amount of fuel that evaporates. The intake air that is capable of pulling up from such walls or surfaces of such small volume of fuel, will mix it with more air, resulting in virtually "zero fuel "adhering" to the surfaces outside the combustion chambers, or the walls of the combustion chambers, eliminating the effects known as wet wall.

The present invention has been made taking into consideration the circumstances described above, in order to eliminate major drawbacks mentioned for better performance of internal combustion engines using gasoline or other fuels. This invention consists of improvements or changes in three aspects of fuel injection systems. These are: 1) A new, improved method of injection in intake manifolds and new intake manifolds. 2) New nozzles and adaptors for actual fuel injectors and new fuel injectors with improved nozzles. 3) Different new methods and algorithms for programming "software" in the engine control computer "MCU". A further objective of this invention is that each area of such invention can be applied separately or individually and still achieve great benefits.

It is an object of the present invention to provide a new method of injection of gasoline for internal combustion engines, consisting of placing the injector a relative distance from and at an angle to the intake valves of the engine. The placement of the injector at such a distance from the intake valves will result in the front of the fuel jet or cone not spraying onto any obstacles such as the walls of the cavity of intake valves, valve stems or valve surfaces as at present. Such placement will ensure that when the front of the jet of fuel is injected and mixed with air it is sucked in as a result of the valves opening at the intake stroke, not from the action of the injection pressure. Therefore, this configuration avoids accumulation of puddles of fuel on the walls and the intake valve surfaces as at present.

It is another object of the present invention to provide an intake manifold consisting of a set of ducts suitable for driving and feeding air from the atmosphere into the combustion chambers. These ducts, connecting the throttle body with the cavity of the engine's intake valves are a size and configuration to allow maximum air to fill the cylinders of the engine. Such a set of ducts in engines of single pistons (see FIGS. 4-B and 4-C) is configured or designed in two main steps, the first shown in 211b, 100 driving air only, the second, in 106 and 102, in which injected air-fuel mixture flows. For clarity, in applications having several pistons, the system will use three steps or sections rather than two (see FIGS. 2, 3). These three steps or sections will be arranged as follows: the first section, 100, only passing air to a second (middle) section 101, and to the third section, 102. At the junction of such first and second sections 100 and 101 will be positioned the injectors. As a result the second intermediate section receives air from the first section and is combined with gasoline or fuel injected by the injector as mentioned, passing such a combination of air and fuel to the third section and toward the intake valves of the engine as a "homogeneous" mixture. There are "n" number of unions between the first and second sections and third sections, where "n" is the number of pistons in the engine. The first section feeds air circulating in the first section to the second (intermediate) section and all third sections. Each of these third sections 102 feed their own piston through their respective inlet valves.

It is another object of the present invention to properly position the injectors in the second intermediate section relative to the third sections. Two prerequisites are:

1. that the jet atomized and injected by the injector is parallel to the longitudinal axis and preferably centered with respect to the third section and whose "cone" of expansion of such a "jet" is as straight as possible, not touching the walls of the duct of the (102) third section, and 2) that there be an appropriate distance between the output of this injector and the intake valve, such that the front of this atomized spray does not "stick to" or "shock" an obstacle, such as the walls or inlet valve stem due to the pressure of injection in this injector. The air/fuel mixture should hit the input of the intake valve when the intake valve is open, and the flowing movement of the mixture being caused by the suction be due to the opening of the intake valve and not the action of the pressure of the injection shot.

It is another object and further variant of the present invention to provide an intake manifold consisting of a set of ducts suitable for feeding air from the atmosphere into the combustion chambers. These ducts, connecting the throttle body with the cavities of the engine intake valves must be of a size and configuration to allow the maximum possible air to fill the engine's cylinders. Such a set of ducts (see FIGS. 5 and 5b) are configured for higher and better fuel air mixing.

Other objectives and additional variants of the present invention are to provide an intake manifold as previously described, but unlike in such prior embodiments, the first section receives the air (usually filtered) from the atmosphere without restriction. That is, without such a restriction, the combustion chambers always fill to the maximum. Without restriction only the capacity of the combustion chambers limit the flow of the air, and only the amount of fuel injected as required by the load applied determines the power of the combustion in the engine. Under these conditions, the air/fuel ratio of the mixture introduced into the combustion chambers will almost always be extremely poor, except in the case of maximum acceleration at full load and this, being at most the stoichiometric ratio. This does not require oxygen sensor or sensors, or the continuous control of the fuel-to-air ratio based on admitted exhaust. Neither does it require the use of the throttle valve body and electronic control mechanism, nor sensors of mass air flow. The result is a very plain, simple, economical and efficient control system, cheaper than at present.

It is another object of the present invention to provide nozzles for injecting gasoline or alternative fuel to an engine to improve the fuel spray and its integration with air within the same nozzles. This will favor an air/fuel mixture that is more homogeneous, avoiding the wet wall effect. These new nozzles will come in three main variations: one of these is to be used in current injectors, improving performance and serving simultaneously as the mounting support on the new intake manifold; another is to be used for new injectors having the new nozzle; and a further variation is to be used in manufacturing new injectors but with the new detachable nozzles. The usefulness of the latter will be appreciated when used for purposes of adjustment and cleaning of the nozzles.

The main advantage of the new design of such nozzles is that the better the fuel spray injection using the best mixing of air and pulverized fuel, the better the shape and diameter as well as the length of the resulting jet. This will accommodate the needs in different and multiple potential applications and varieties of combustion engines, as well as the fuel injection pressure in the injector of fuel, according to the new method of injection and design of intake manifolds. The new nozzle will be simple and easy to manufacture. More details will be shown below.

Programming Methods in the Electronic Control "MCU".

New methods will be used for the electronic control of the moment of activation of the fuel injectors, the aim being, firstly, that the fuel be injected at a time in the cycle of operation of the internal combustion engine to give the fuel the maximum possible exposure time with the intake air for better physical mixing between them prior to the time of admission, but without giving it time to settle to the bottom of ducts or that the inertia of the injected jet reaches the front of the intake valves when the latter are closed. On the other hand, considering the distance between the nozzle and the valve inlet and the necessary duration of the injection fuel shot, this will allow the final part of the fuel jet to be injected and mixed with air to enter fully into the same cycle in the combustion chamber safely. That is, all the fuel mixed with air will be injected before the intake valve closing, with no residue for the next cycle.

A new method for detecting the "knock" or detonation in an internal combustion engine will be added such as a set or electronic sections that can add and store the different peaks of voltage supplied by current detonation sensors during a selected time or window cycle. A routine computer program will monitor such voltage stored and presented in an inlet analog-to-digital converter. This time period will run from the moment of ignition of the spark plug, at a little after the top dead center, for approximately 80 degrees of crankshaft rotation. At the end of this time, the capture window analyzes and stores the voltage level, stored for later comparison with previously established limits and decision making in the software program of the control computer "MCU", and returning the electronic system to a level of no signal, keeping it in this state until the next time the capture window again enables detection. The electronic section may be as simple as a circuit known as a half-wave rectifier (see FIG. 16) fed by the corresponding knock sensor. Formed by a diode, it will conduct during the positive pulse from the knock sensor, a capacitor that will store the voltage detected by adding all the pulses from such knock sensor during such capture window time mentioned, a zener diode for protection of the entry "ADC" of the "MCU" and an enabling element for the detection time limit, for example, a transistor, which enables and discharges the capacitor as commanded by the program.

Another object of this invention is the ease and greater safety of the detection of detonation in an internal combustion engine by means of the previously described system of this invention. With a single "sample" voltage level stored in the above-mentioned capacitive circuit it can tell or identify what happened during the time of the aforementioned "capture window". Currently "frequency filters" detect the possible "range" of pulse detonation and continuously monitor during a selected time when they receive a pulse whose level represents detonation present, using extensive resources and time of the microcontroller contained in the engine control computer "MCU".

Here is another, different and new method for detecting the "knock" or detonation of internal combustion engines: it consists of measuring the time of rotation of crankshaft sections. Dividing the 360 degrees of rotation of the crankshaft in many degrees or fixed sections as needed and/or possible, storing for recalling the time of such sections so those times recorded in advance can be compared with the sensed times, thus being able to detect when there is a slowing down, or "braking" of the engine and indicating detonation.

It is not required to have electronics or sensors to detect detonation; only the crankshaft position sensor and camshaft current are required, measuring the time interval between pulses by the same sensors which are used for control and detecting times and positions of the engine. It is evident that this mode of detection is better than the currently used knock sensors.

This invention provides a new method for controlling the idle speed and/or power required by the load of an internal combustion engine.

This method solves the problem mentioned above, the problem of the volume of the air/fuel mixture minimum admitted inside the engine's combustion chambers. The basic objective of this new strategy or method to control the speed of idle and/or load of an internal combustion engine is reduced engine power based on reducing the number of power cycles of the engine, together with controlling the minimum fuel injected. The cycles in which no fuel is fed to the desired or selected engine's combustion chambers is controlled. That is, if the minimum fuel injected is achieved and yet results in more power than required by the engine, the last requiring lower rpm and/or power, rather than a further decrease of the volume of injected fuel which would cause such a minimum fuel combustion problem, we remove some engine power cycles. Normally, in an engine of four strokes and four pistons, for example, a power cycle occurs (combustion or expansion cycle) every 180 degrees of crankshaft rotation; thus, two power cycles per revolution of the engine's crankshaft and two intake cycles. With this new method fuel is fed (injected) only on some engine's intake cycle every one, two, three, four, five or six and so on engine intake cycles depending on the applied or desired load and/or the desired speed. The number of cycles of the preferred alternative is every 1, 3, 5, 7 and so on cycles to evenly spread the pistons in use. The volume of gasoline or fuel injected at least for the this cycle is an appropriate minimum and established according to the characteristics of the combustion engine in question, in order to achieve proper combustion as efficiently as possible. To accelerate or increase power, a larger volume of fuel is used and/or a greater number of power cycles with the fuel supply active is used until all cycles are fed with fuel. Conversely, to decelerate, injecting a smaller volume of fuel without having the minimum and/or decreasing the number of power cycles is used, with cycles without any fuel injected and, during deceleration or braking, fuel injection is completely cut off when so desired and/or necessary.

BRIEF DESCRIPTION OF THE SEVERAL DRAWINGS

FIG. 1. Schematic view of the prior art showing the positioning of the injector in the systems known as "multiport". It illustrates how the injected fuel spray hits the walls and intake valves due to the injection pressure and injector proximity to such walls and valves, causing the problem of "wet wall".

FIGS. 2, 3, 4, 4B, 4C, 5 and 5B show variations of the new fuel injection strategy and the new manifold systems of the present invention, as well as the positioning of the injector 200 in duct 101 with respect to the duct 102 of the manifold and the inlet valve.

FIGS. 10, 11, 12, 13, 14 and 15 show variations of new nozzles for the construction of new injectors considering the different needs for different models and applications of internal combustion engines.

FIGS. 10-*b* and 10-*c* show different designs of "stems" or "pillars" for dispersion of fuel by the new nozzles.

Figure 15:
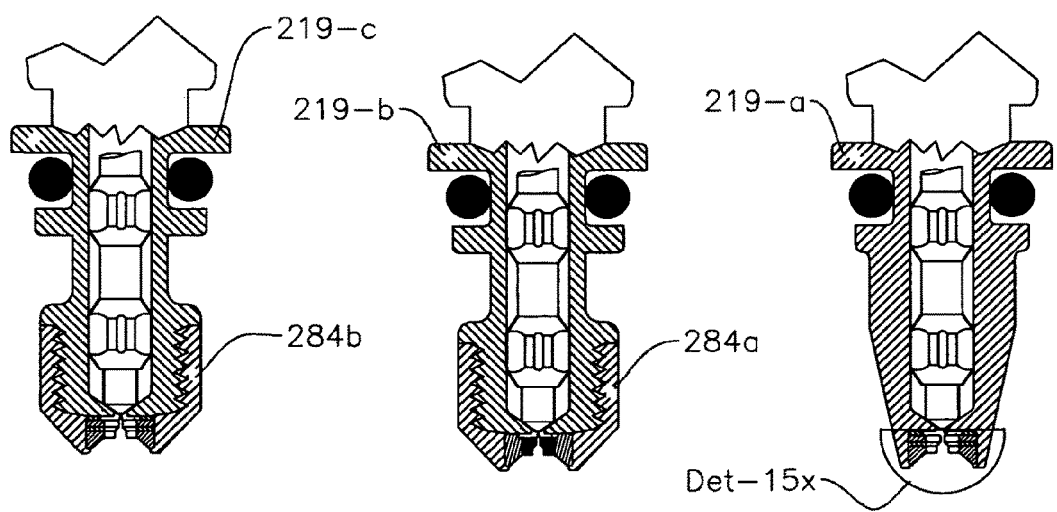
Figure 15B:
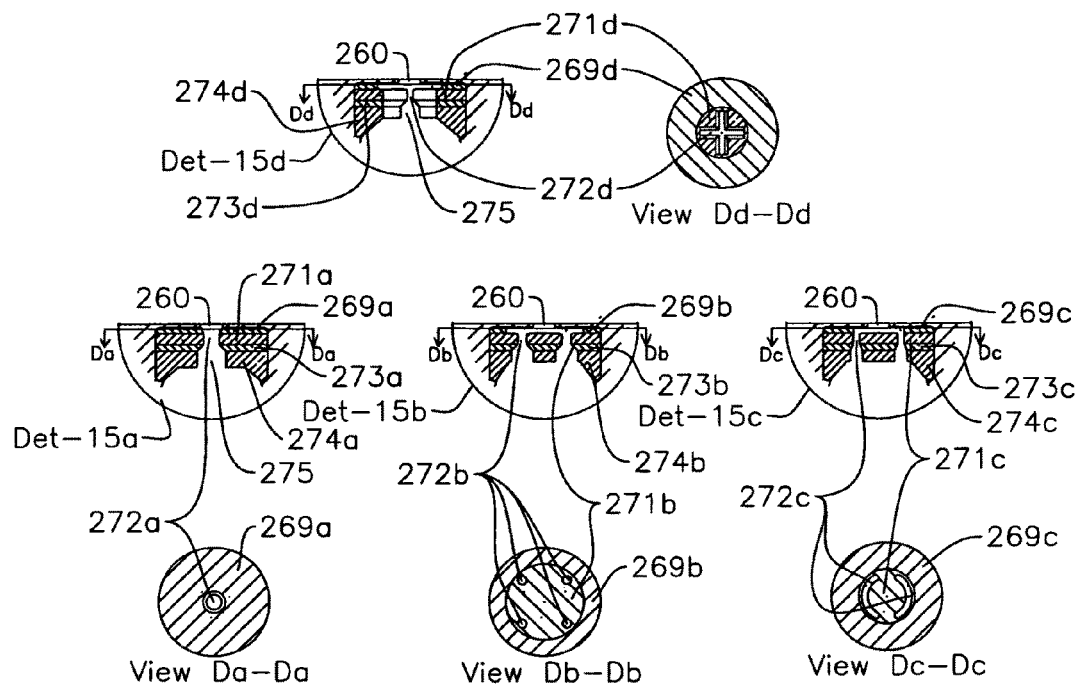

FIG. 15*b* shows a different design of "slot", "diffuser" or "dispersion" of fuel for use in the new nozzles mainly shown in FIG. 15, instead of the "pillar" in FIGS. 10-*b* and 10-*c*.

Figure 15C:
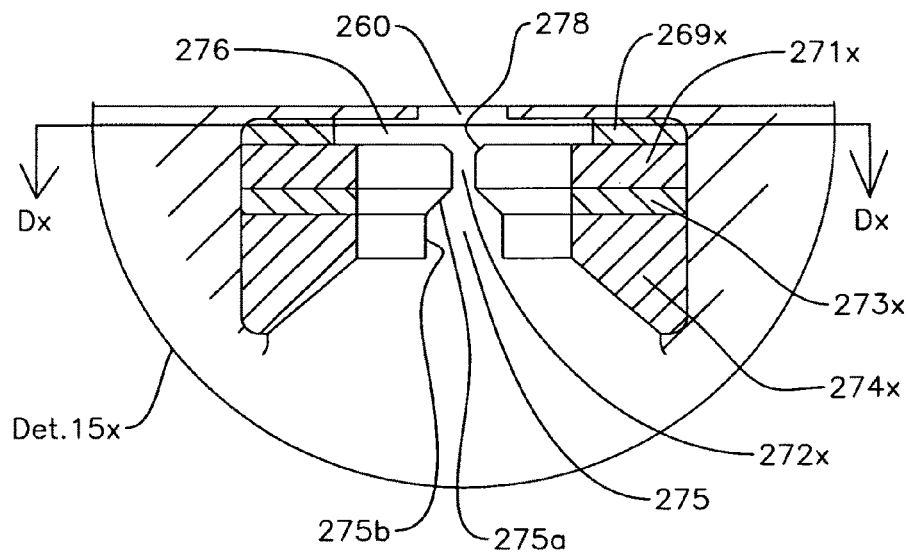

FIG. 15*c* shows an enlarged detail of the "diffuser" core 15*b* as shown as 260 is the hole injecting the fuel; 276 is the distribution chamber, 278 is a chamfered fuel inlet into the slots or nozzles 272*x* (see also FIG. 15*b*) and the expansion chamber 275 formed by 275*a* and 275*b* for fuel expansion control, direction and size of the jet cone of fuel injected.

Figure 16:
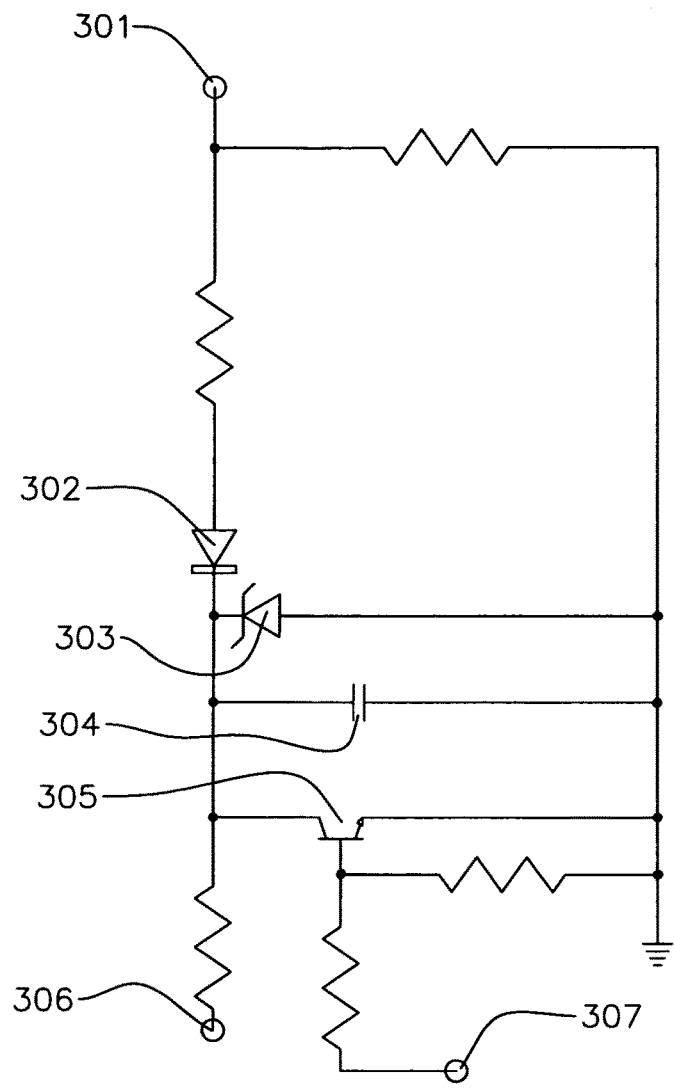

FIG. 16 shows a new basic electronic circuit and its elements for detection of knock or detonation for internal combustion engines.

DETAILED DESCRIPTION OF THE INVENTION

New Intake Manifold.

Figure 2:
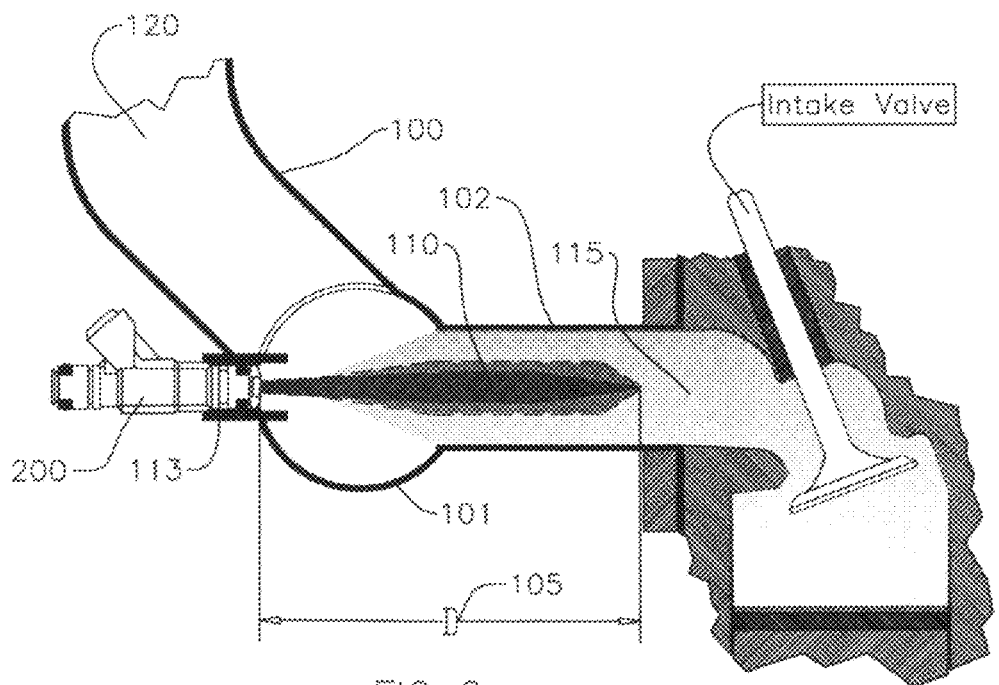
Figure 3:
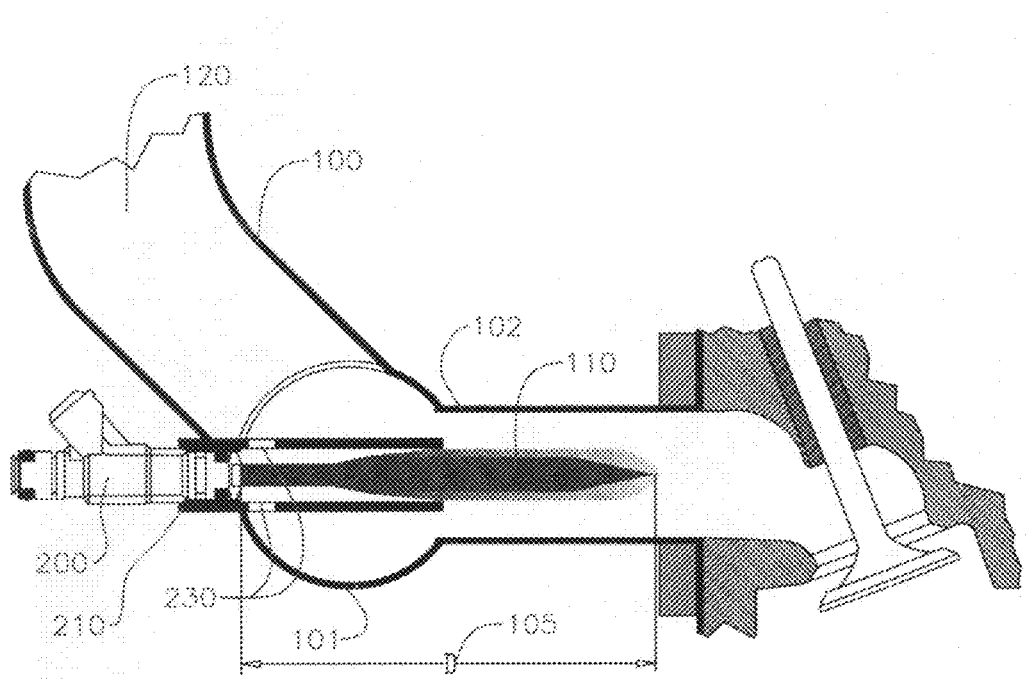
Figure 4:
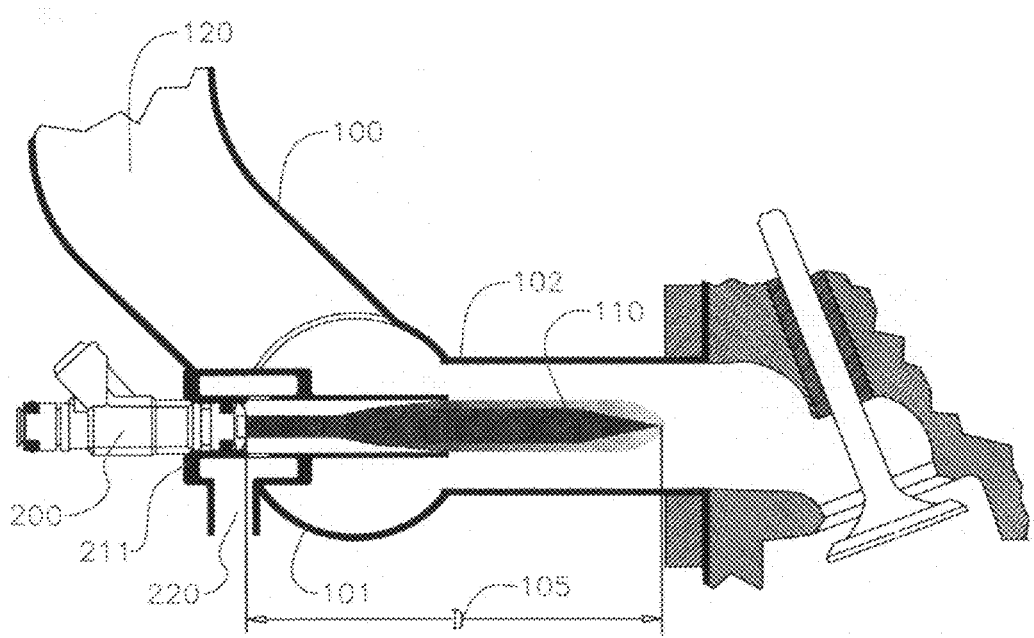
Figure 13:
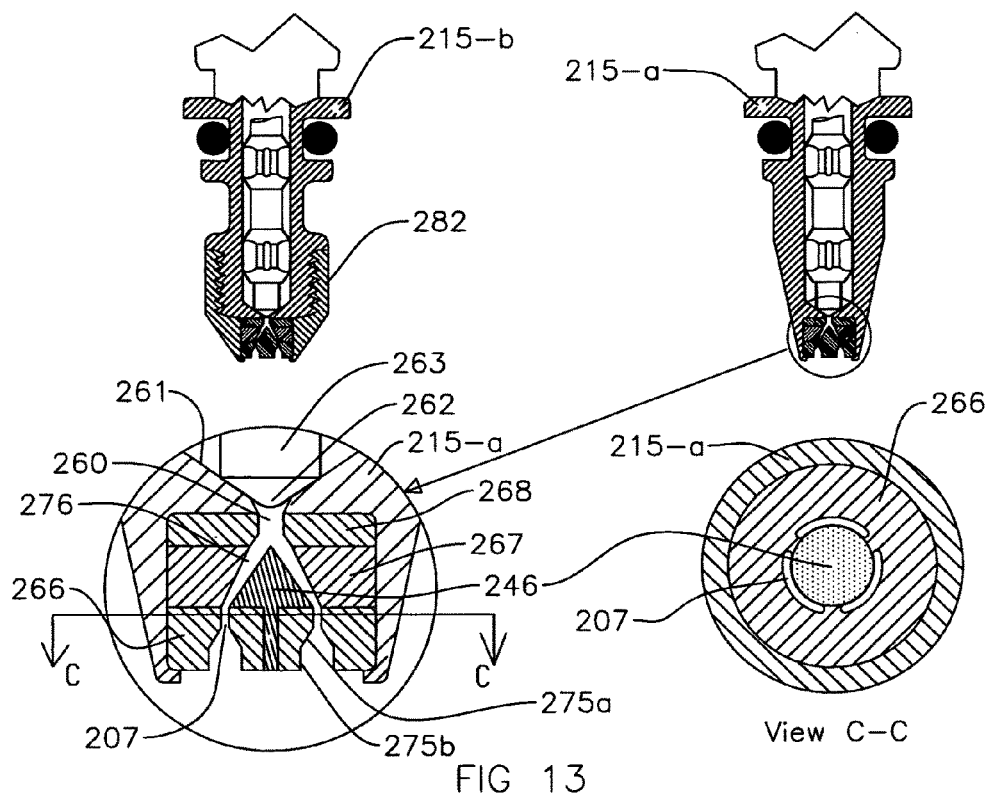

With reference to FIGS. 2, 3, 4. The injectors 200 are a type of current injector, attached to the new intake manifold section 101 via bracket 113 and through the new nozzles 210, 211, 212 or 213. Selecting said injector 200 (FIG. 2) by a jet of injected fuel that is most similar to that indicated in the figures with 110. It is preferable to use a nozzle whose jet of fuel to be injected does not touch the walls of the duct section 102 and the length or extent indicated by the distance D, 105 does not reach the intake valve as a result of injection pressure, but until the 110 jet as forming a "cloud" of air/fuel 115 is moved together with the air 120 by the sucking action of the pistons during the intake stroke when the intake valve is opening, thus avoiding the deleterious effect of wet wall. The inlet air 120 mixes inside the duct 102 with the fuel jet or cloud 110 forming a homogeneous mixture of fuel air 115 in FIG. 2 that is sucked into the combustion chamber by opening the intake valve, continuing the physical mixing during this time, resulting in a fairly homogeneous fuel/air mixture ready to be fired at a rapid combustion and giving high power and efficiency at the end of the compression cycle with a spark plug (not shown). The intake manifold is formed by the duct 100 leading air from the atmosphere 120 through a suitable filter usually used (not shown) and air acceleration body or valve control airflow (also not shown) in the drawings. The conduit 100 connects with the duct 101 where the injectors 200 are positioned. Duct 101 in turn connects with the duct 102. There are as many such ducts 102 as there are pistons and injectors in the engine. FIG. 4-B shows a simpler intake manifold for feeding single-cylinder engines, mainly small displacement ones. It is formed by an injector support 211*b* similar to FIG. 7 but without the central stem duct 24X and the elongate duct 106, accommodating a 215-*b* injector whose details are shown in FIG. 13; the intake air is shown as 120 entering the support 211*b*. In FIG. 5 is shown an intake manifold mode with two parallel ducts 100 and 100*b* leading air from two independent air control valves, similar to the system previously known as "two throats" and for the same purpose, (not shown) and connecting with respective ducts 101 and 101*b* which in turn are connected to the ducts 114 and 102 where flows are added and mixed with air and fuel from duct 114 with more air from the duct 100*b* if the air control valve corresponding (not shown) is open, the latter depending on the engine's operating condition.

Figure 6:
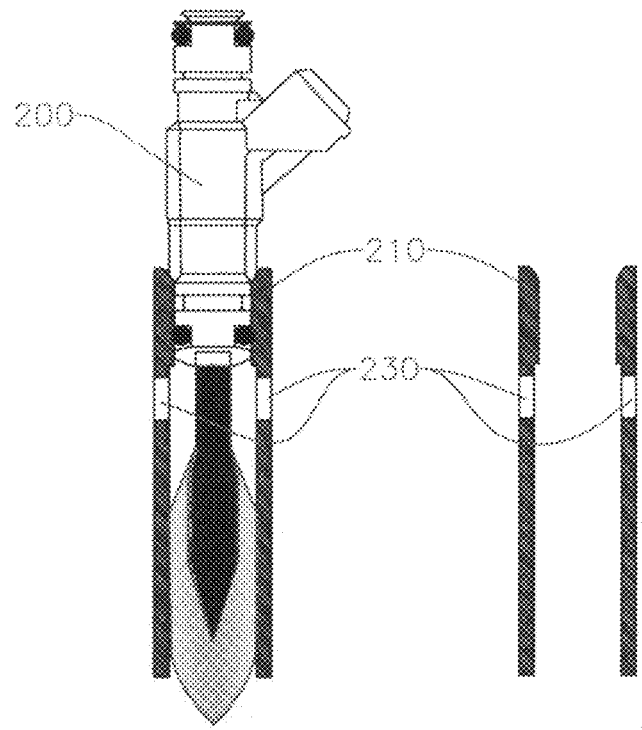
FIGS. 6, 7, 8 and 9 show variations of new nozzles for current injectors fitted in the form necessary and appropriate to the new system of fuel injection strategy and intake manifold.
Figure 7:
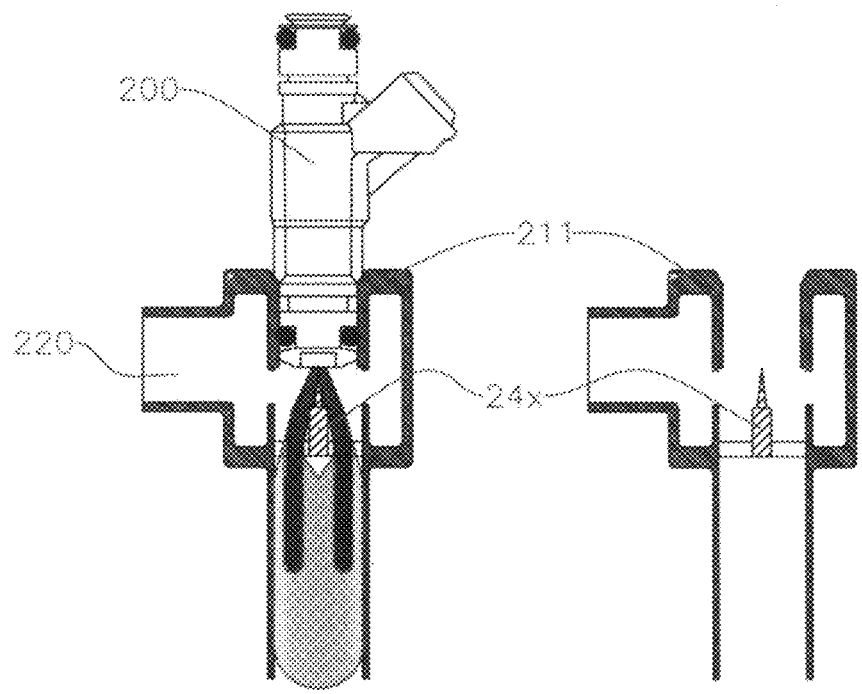

It will be noted that in such a configuration or arrangement of the intake manifold shown in FIG. 5 is another variant of the nozzles shown with air inlets in the body 230 (see FIG. 6) thereof, which corresponds to the duct 100 and a nozzle duct 114 and more clearly shown in FIG. 7 as air 220 corresponds to 120 of FIG. 5 and nozzle 211 in FIG. 7 which corresponds to the ducts 100, 101 and 114 of FIG. 5.

FIG. 5-B shows a further variation in the geometry of an intake manifold for feeding individual cylinders and for the purpose and function as described for FIG. 5 and with a nozzle 211b by changing the nozzle other than those mentioned in this description (FIGS. 6 to 15) make an intake manifold of functionality as in FIGS. 2 to 4. Also, as another variation in the implementation of this new invention and also having the same objective, the ducts 100 and/or 100b and/or 101c may be fed with air from the atmosphere without any restriction, no valves or forced flow. In this way, the air-filling of the combustion chambers during the intake cycle will always be the maximum. Thus, it is not required to detect if the mixture is rich or poor by oxygen sensors; the mixture will always be "poor" except at full power when it may be "stoichiometric". It will never be "rich". Adjusting the volume of fuel injected by the injector will only happen in relation to the power required of the engine; this avoids the complex and sometimes wrong, continuous monitoring of the air/fuel ratio; therefore, no oxygen sensors will be required at the exhaust or in the air entry into the ducts 100. This is possible because of a good homogeneous air/fuel ratio result from the present invention which produces an air/fuel mixture "poor" in fuel.

Referring to FIG. 6, there is shown a nozzle 210 suitable for housing a current injector 200 for limiting the expansion of the jet cone inside the nozzle body 210. This nozzle is suitable for the injector jet whose fuel is injected fairly well pulverized and straight and whose cone jet is small in length, not exceeding the distance 105 in FIG. 3 and not greater than the inside diameter of the nozzle 210 (see FIG. 3 item 110). The fuel jet injected by the injector 200 is mixed with air entering into the nozzle through the holes 230 located around the nozzle 210 and near the fuel outlet nozzle 200. This air entering through the holes 230 prevents the fuel from "sticking" to the inner wall of the nozzle 210 and also promoting the physical mixture of air and fuel, preventing the formation of "wet wall" within the nozzle and the walls of the duct inlet manifold 102 and inner cavity of the intake valve as shown in FIGS. 2 to 5.

Figure 1:
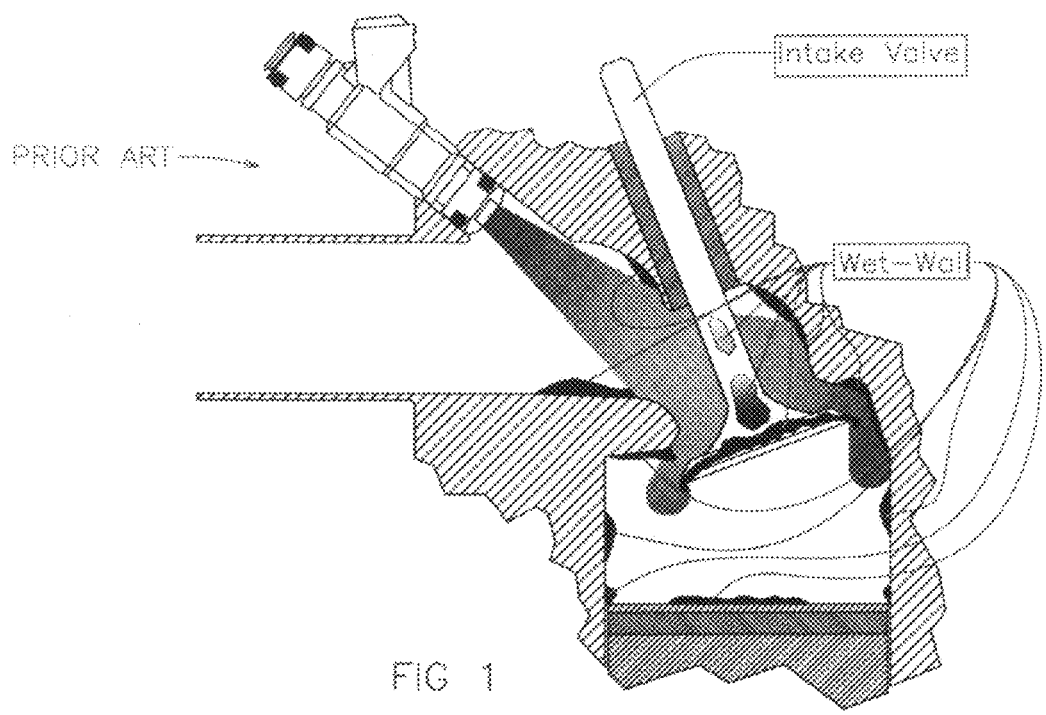
Figure 8:
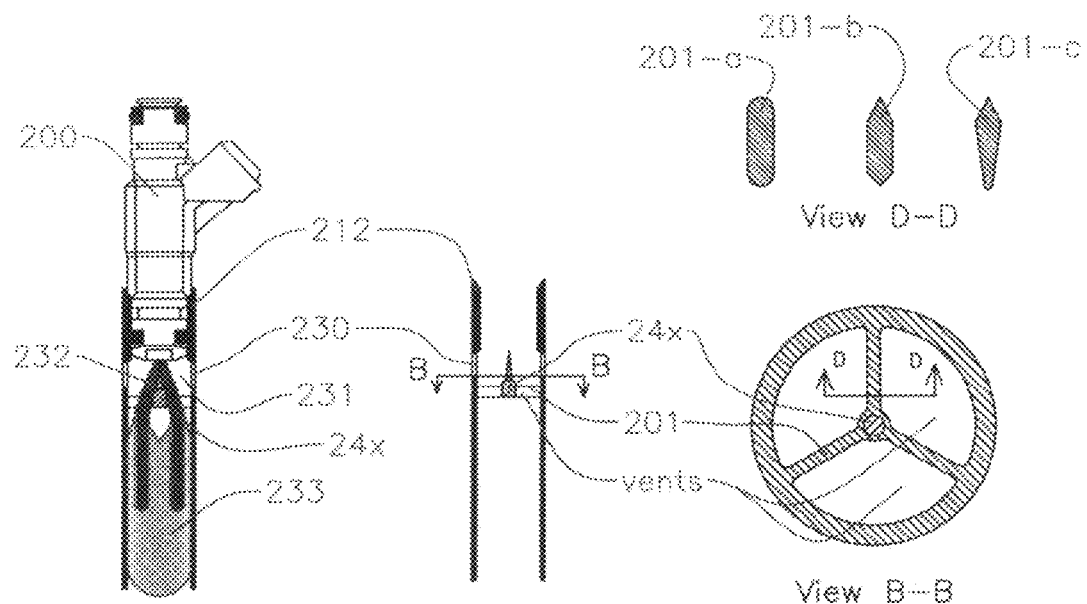

FIG. 8 shows a section of another nozzle 212 suitable for use to contain and manage adequately the jet stream of an injector whose injection current is straight and very concentrated, say, with a single nozzle outlet orifice and without forming a cone in such a jet exit. The "pillar", "stem" or "disperser" 24x (hereinafter called either "disperser" or "stem" to refer to the same element) has three functions: first, to open the jet fuel injected 232, second, to spray more fuel as the last hit it and third, to slow down the jet 232 to prevent the injection pressure in the injector 200 making the jet reach the intake valve as seen in FIG. 1, which would cause a "wet wall" effect. The distance 105 in FIGS. 3 to 5 is relatively greater than that shown in FIG. 1.

Depending on the injection pressure of fuel within the injector and the fuel outlet port and the design of the fuel outlet port and depending on the intended application, the geometry of the disperser 24x may be varied. Some possible variations are displayed as appropriate dispersers 240, 241, 242, 243 and 244 in FIG. 10b.

As stated previously in FIG. 8, the "disperser" 24x, slows the jet 232 somewhat and opens as a cone, pulverizing the fuel injected by the injector 200, mixing with air 231 from the holes 230. This air/fuel mixture passes through windows ("vents") formed by the outer wall of the nozzle 212 and the "bridges" 201 of the disperser 24x. (See sectional view BB and possible geometries of the bridges 201 in the view shown in FIG. 8 DD, forming the air/fuel mixture 233 which in turn is mixed with more air in the interior of the ducts 102, allowing the mixture to pass through the opening of the intake valve and inside the combustion chamber, achieving the homogeneous air/fuel ratio required, with no "wet wall" effect.

FIG. 7 shows a section of a nozzle 211 with an air chamber 220 separate from the air within the common duct 101 (FIG. 4) and disperser 24x. This air 220 will come from one valve or orifice suitable for various engine applications, i. e. a feature that may be useful elsewhere. Such air 220 may feed the initial air/fuel mixture into the nozzle as previously explained and whose function is very similar to the intake manifold shown in FIG. 5, i. e., ducts 100, 101 and 114 and in FIG. 5-B air inlet 120 of nozzle 211b, (FIG. 4). In this case, the nozzle 211b (FIG. 5-B) is similar to 211 but without disperser 24x since this function is in injector 215 (FIG. 13).

Figure 9:
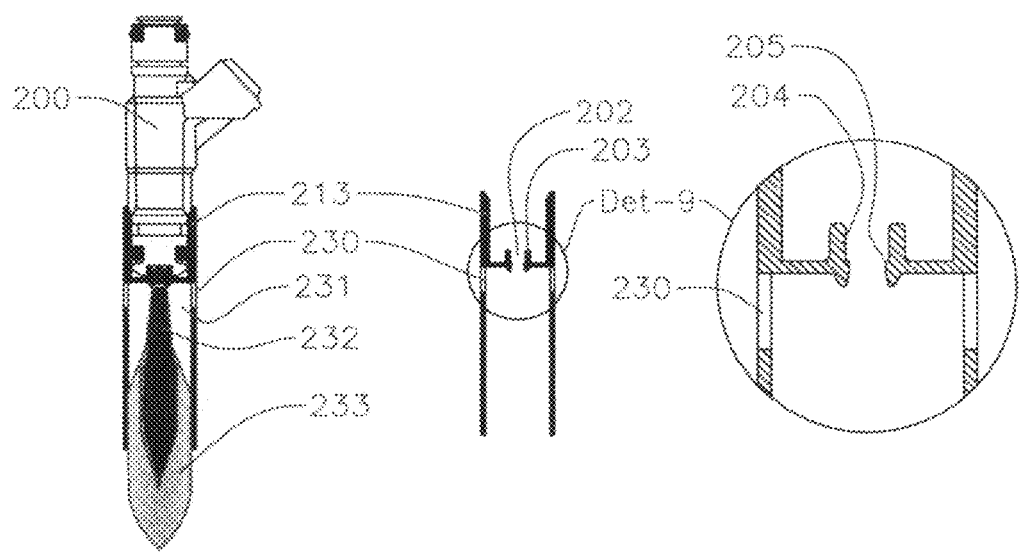

FIG. 9 shows a section of another nozzle 213, suitable for use to contain and manage adequately the jet of a current injector whose jet cone is too wide, or multiple jet outlet orifices designed for applications in combustion engines of two or more intake valves per cylinder. We see in this nozzle 213 (as distinguished from 212), that it concentrates the jet in the "hub" 203 instead of in the opening as does the disperser 24x.

The nozzle 213 of FIG. 9 receives the jet or jets of fuel injected into the chamber 202 of the "hub" 203. This slows down the speed of the injected fuel somewhat at wall 204 and ledge 205. The fuel at 204 and 205 (see Detail of FIG. 9), further fragments the droplets of the injected fuel flow due to the injection pressure forming a well pulverized fuel stream 232 which in turn is mixed with air 231 from the holes 230 forming the air/fuel mixture 233.

FIGS. 10, 10-b, 11, 12, 13, 14 and 15 show injectors 217, 216, 214, 215, 218, 219a and 219b. These new injectors are objects of the present invention. They incorporate in their nozzles the "disperser" 24x shown in FIGS. 10-b, 10-c and/or "slots" or "diffusers" in FIG. 15b with the enlarged detail in FIG. 15c also an object of the present invention.

These new injectors 214 to 219c having in common the body, (not shown) contain the usual elements of current injectors, i. e., electrical winding, armature, spring connection rod movement etc. Not shown, we can see in FIG. 13 the rod 263 with its conical tip 262 which sits on the surface 261 to close the fuel outlet port 260 of body 215 towards the disc or plate 268. Upon energizing the coil of the injector rod, the rod 263 is moved longitudinally, opening the passage of the fuel exit through the hole 260 due to the pressure of the fuel within the injector. Hence the jet exiting the orifice 260 decreases in speed. The "disperser" 246 is embedded in the disc or plate 266 supported by the bridges 209 and 267 forming the separator chamber 276, opening and spraying the fuel jet exiting as a fine "fog" fuel (very small drops) by circular grooves 207 of disk 266 shown in view CC of FIG. 13 and expanded by the expansion slots of 275a shown with a length 275b expansion control.

Figure 14:
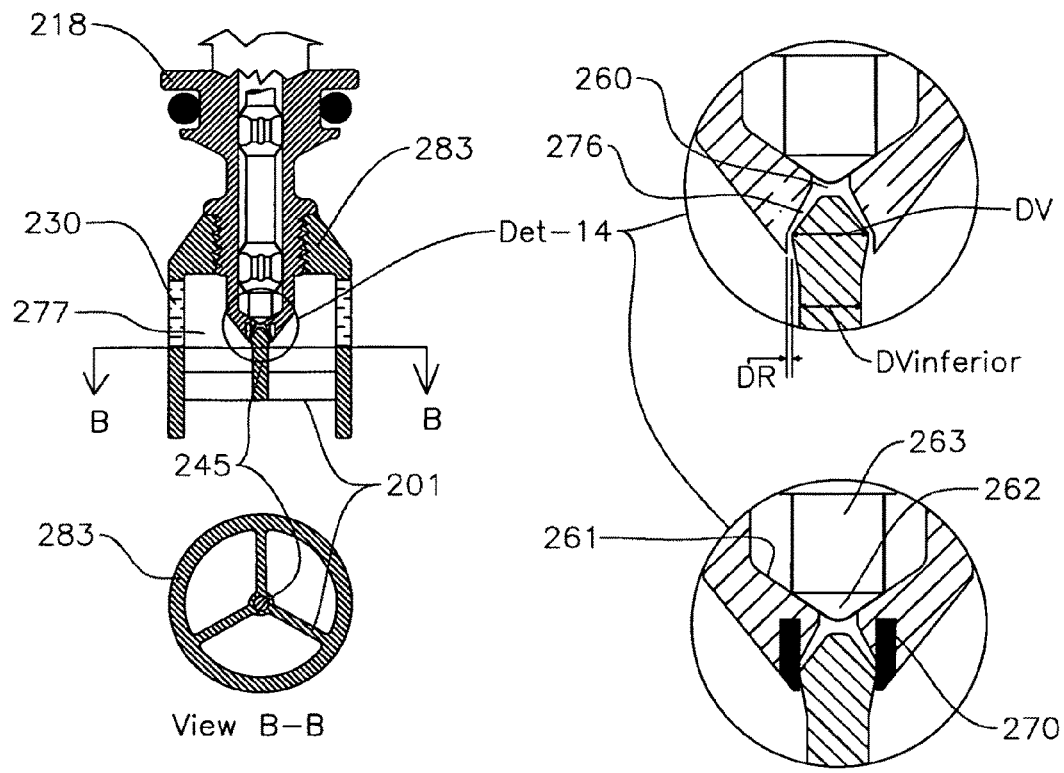

FIG. 10 shows the crossection of an injector 217. Its nozzle 280 is screwed to the injector body 217 and can be removed for possible adjustment and/or for cleaning the orifice 260. Nozzles 282 in FIG. 13, 283 in FIGS. 14 and 284a and 284b shown in FIG. 15 serve the same purpose.

Figure 11:
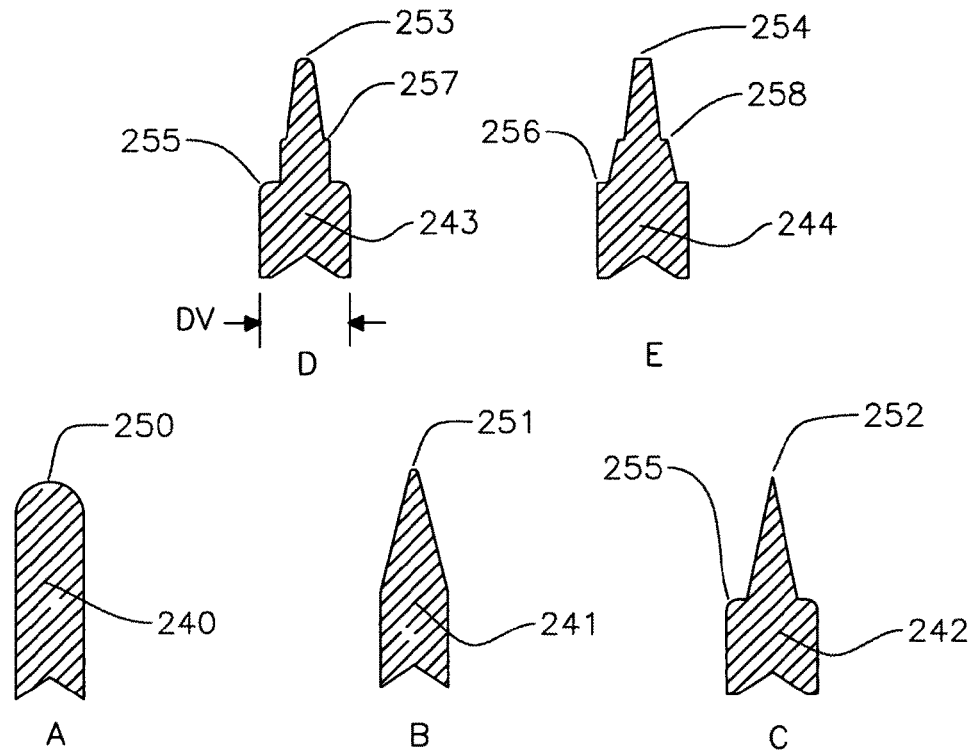
Figure 11:
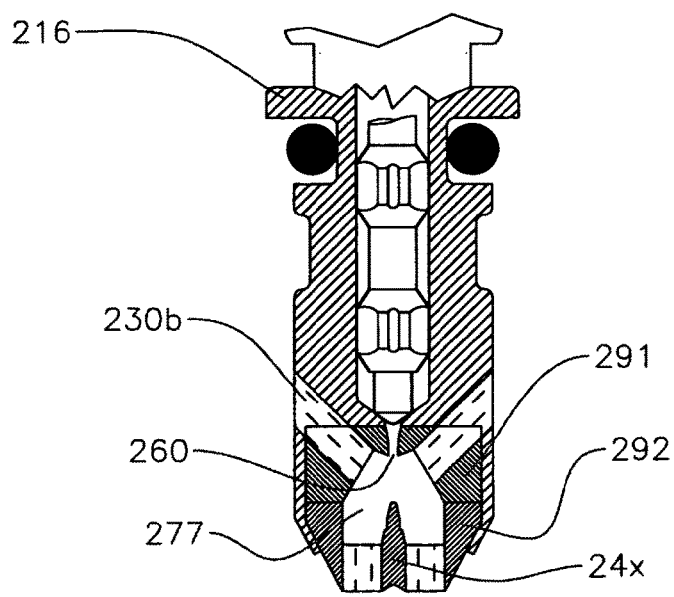

FIG. 11 shows injector 216 with its "disperser" 24x and the air inlet holes 230b to start the air/fuel mixture within the nozzle of the injector and fuel air mixing chamber 277, formed by the discs 291 and 292.

Figure 12:
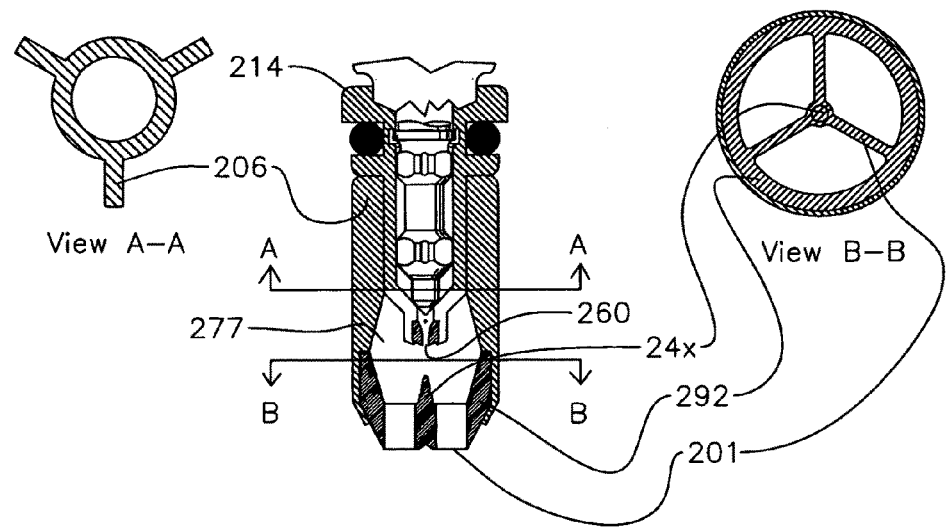

FIG. 12 shows injector 214 consisting of a variant shown in FIG. 11 The basic difference is that injector 216 has a larger opening for entry of air into the nozzle and fuel air mixing chamber 277 bounded by the "fins" 206 that support the "disperser" 24x and bridges 201 of disc 292, views A-A and B-B. The nozzle 218 of FIG. 14 is a variant of 215 shown in FIG. 13. Here the "disperser" 245 mounted on the detachable mouthpiece 283 of injector 218, approaches the hole 260, forming a spray chamber 276 as shown in FIG. 14 Det-14, being very close to the exit orifice 260 of the injector. Spacer bolts 270 have the function of centering and maintaining the "disperser" 245 at the desired distance leaving an opening "DR" for fuel outlet, achieving a high jet fuel spray at the exit orifice 260 of nozzle-like flow 215 (not marked on the drawing of FIG. 13) but, unlike the latter, the injector 218 (FIG. 14) is an air/fuel mixing chamber 277 as the nozzles of FIG. 10 with the "disperser" 245 with its detachable mouthpiece 283, also for adjustment and/or cleaning purposes. As in FIG. 13, the injector 215, the diameter "DV" from the "disperser" 245 is greater than at its base "DV inferior" as shown in FIG. Det-14 for separating a bit the stream of fuel exiting the space "DR" at the base of the disperser for better integration and mixed with air entering through the holes 230 in chamber 277.

FIG. 10-b shows some variants of the "disperser" indicated as 24x, which may be more appropriate than others for different engine applications, design of injectors, fuel injection pressure and type of fuel. We have in this FIG. 10-b and details in FIG. 10-c a disperser 240 with spherical tip 250. We see disperser 241 with a tapered and rounded tip 251 at the upper end. The disperser 242 has a sharp tip 252 and is also tapered but with a flange or shoulder 255 at right angle with the longitudinal axis of the disperser and perpendicular to the flow of fuel to cause an additional shock of the injected fuel jet and a greater spraying of the same. The nozzle D disperser 243 has two rounded projections 255 and 257 for fuel shock. The disperser 244 is similar to 243, but unlike the latter, with the protrusions 256 and 258 rather than rounded straight as rod 243 and its protrusions 255 and 257. The diameters "DO" of the orifice 260 and "DV" of disperser 24x and the distance "DOV" between them shall be appropriately sized to ensure that the volume of fuel flows so that the fuel (shown as 110 in FIGS. 2-5) is properly pulverized and adapted in shape and size as indicated in FIGS. 2 to 5 according to the injection pressure, fuel, application and type of engine, and adapted in shape and size as indicated in FIGS. 2 to 5.

Those experienced in the field of this invention should, based on the detailed descriptions of the objectives and new methods, be able to understand the logical possible variations. They will be able to adopt appropriate strategies, dimensions and geometries depending on the various applications and needs of different engines, not specifically shown in this application, but within the general goals and objectives of this invention.

What is claimed:

1. A homogeneous air-fuel mixture system for an internal combustion engine having at least one combustion chamber and at least one intake valve operatively connected to said at least one combustion chamber, comprising:

an air intake manifold comprising a section having a substantially circular cross-sectional configuration, a first upstream section defined around a first longitudinal axis, fluidically connected to a source of air, and fixedly connected to a first arcuate section of said air intake manifold having said substantially circular cross-sectional configuration, and a second downstream section defined around a second longitudinal axis different from said first longitudinal axis, fluidically connected to said at least one intake valve of said at least one combustion chamber of said internal combustion engine, and fixedly connected to a second arcuate section of said section of said air intake manifold having said substantially circular cross-sectional configuration;

a fuel injector assembly for injecting fuel outwardly from a fuel injector dispensing exit into said air intake manifold at a point proximate to the location at which said first upstream section of said air intake manifold joins said second downstream section of said air intake manifold and at which said first longitudinal axis of said first upstream section of said air intake manifold intersects said second longitudinal axis of said second downstream section of said air intake manifold; and a support structure mounting said fuel injector upon said section of said air intake manifold having said substantially circular cross-sectional configuration, annularly surrounding said fuel injector dispensing exit, projecting axially away from said fuel injector dispensing exit, extending into the air space of said section of said air intake manifold having said substantially circular cross-sectional configuration at said point proximate to said location at which said first upstream section of said air intake manifold joins said second downstream section of said air intake manifold and at which said first longitudinal axis of said first upstream section of said air intake manifold intersects said second longitudinal axis of said second downstream section of said air intake manifold, and extending coxially with respect to said second downstream section of said air intake manifold along said longitudinal axis of said second downstream section of said air intake manifold so as to effectively initially confine said injected fuel to a spray pattern having a predeterminedly narrow width dimension along said second longitudinal axis of said second downstream section of said air intake manifold and wherein surrounding intake air will mix with said injected fuel so as to form an air-fuel mixture with said injected fuel and which will further aid in confining said injected fuel to a spray pattern having a predetermined width dimension along said second longitudinal axis of said second downstream section of said air intake manifold such that said air-fuel mixture will effectively be prevented from approaching interior wall portions of said second downstream section of said air intake manifold leading to said at least one intake valve of said at least one combustion chamber of said internal combustion engine until said air-fuel mixture is immediately adjacent said at least one combustion chamber of said internal combustion engine.

2. The system as set forth in claim 1, wherein:
said support structure comprises an annular nozzle.

3. The system as set forth in claim 2, wherein:
said annular nozzle has apertures defined within wall portions thereof so as to admit intake air into said nozzle so as to mix with said injected fuel injected out from said fuel injector.

4. The system as set forth in claim 3, wherein:
said apertures of said annular nozzle admit intake air into said nozzle such that said intake air into said nozzle effectively confines said air-fuel mixture to a predetermined width pattern such that said air-fuel mixture does not stick to interior wall portions of said nozzle.

5. The system as set forth in claim 1, further comprising:
a disperser disposed downstream from said fuel injector dispensing exit.

6. The system as set forth in claim 5, wherein:
said disperser comprises a substantially cylindrical structure with a rounded tip disposed upon an end portion of said upstream portion facing said fuel injector dispensing exit.

7. The system as set forth in claim 5, wherein:
said disperser comprises an axially tapered structure with a rounded tip disposed upon an upstream end portion facing said fuel injector dispensing exit.

8. The system as set forth in claim 5, wherein:
said disperser comprises an axially tapered structure with a sharp tip disposed upon an upstream end portion facing said fuel injector dispensing exit.

9. The system as set forth in claim 8, wherein:
said disperser comprises a flanged shoulder portion annularly surrounding said tapered structure.

10. A homogeneous fuel-air-mix apparatus for an internal combustion engine, the internal combustion engine having at least a combustion chamber fed by at least an intake valve, the apparatus comprising:
at least one intake manifold for placing at least a fuel injector, said at least one intake manifold comprising:
a first duct that provides an upstream air input section fed by air; and
a second duct that provides a downstream air-fuel-mix output section operatively connected at a union point to said upstream air input section, said downstream air-fuel-mix output section being a straight section of a predetermined length operatively connected at its output end to an input cavity of said internal combustion engine's intake valve;
wherein said union point provides a place to install at a position a fuel injector at said union point;
wherein said place is at a predetermined distance from said input cavity of said internal combustion engine's intake valve;
wherein there is an equal number of said union point places and of said downstream air-fuel-mix output sections as there are combustion chambers in said internal combustion engine;
a fuel injector placed at said union point, said fuel injector configured to provide a fuel spray at its output;
a nozzle, wherein said nozzle provides position support for placing said fuel injector at said place, said nozzle comprising:
an outer wall, air input means, said air input means configured to allow air through said outer wall; and
a pillar, said pillar supported by at least two bridges which connect said pillar to said outer wall to provide a position of said pillar within said outer wall, said pillar being longer than said bridges in longitudinal direction of said outer wall;
said pillar configured to be impacted by said fuel spray and expand it, providing an expanded fuel spray;
said outer wall configured to be impacted by said expanded fuel spray and limit the expansion of said expanded fuel spray such that said expanded fuel spray is guided in a single direction along a fuel jet axis; and
wherein said position to install said fuel injector aligns said fuel jet axis with a longitudinal axis of said downstream air-fuel-mix output section.

\* \* \* \* \*